United States Patent [19]

Moore

[11] 4,340,613
[45] Jul. 20, 1982

[54] METHOD OF COOKING SHELLFISH

[76] Inventor: Michael R. P. Moore, 11724 Lovejoy St., Silver Spring, Md. 20902

[21] Appl. No.: 966,631

[22] Filed: Dec. 5, 1978

Related U.S. Application Data

[63] Continuation-in-part of Ser. No. 833,133, Sep. 14, 1977, abandoned.

[51] Int. Cl.³ .............................................. A22C 29/00
[52] U.S. Cl. ................................... 426/456; 426/479; 426/510; 426/643
[58] Field of Search ............... 426/643, 418, 443, 455, 426/456, 465, 472, 479, 480, 510, 511, 520, 523; 99/469, 472

[56] References Cited

U.S. PATENT DOCUMENTS

| | | | |
|---|---|---|---|
| 2,155,308 | 4/1939 | Harris | 426/479 X |
| 2,420,063 | 5/1947 | Barrett | 426/643 X |
| 2,978,334 | 4/1961 | Lapeyre | 426/479 |
| 3,264,116 | 8/1966 | Gray | 426/643 X |
| 3,476,569 | 11/1969 | McCarthy | 426/643 |
| 3,692,545 | 9/1972 | Moore | 426/643 X |
| 3,773,962 | 11/1973 | Trelease et al. | 426/479 |
| 3,843,810 | 10/1974 | Fehmerling | 426/643 X |

*Primary Examiner*—Arthur L. Corbin
*Attorney, Agent, or Firm*—Kenneth E. Darnell

[57] ABSTRACT

A method for cooking shellfish, particularly crabs, lobsters, shrimp, and other crustaceans having skeletal portions from which the edible portions are removed prior to consumption, the present method provides substantially increased shelf life to the cooked shellfish and facilitates mechanical removal of the edible portions from the exoskeleton and/or skeletal portions thereof. The present method comprises the steps of: (1) subjecting the shellfish to steam at a gauge-pressure of between one and fifteen pounds and at temperatures between 175 and 240 degrees F. for one to thirty minutes; and, (2) subsequently applying a vacuum to the cooked shellfish in a range between one and twenty-six inches of mercury for a period of one to thirty minutes to withdraw moisture therefrom.

11 Claims, 1 Drawing Figure

METHOD OF COOKING SHELLFISH

CROSS-REFERENCE TO RELATED APPLICATION

This application is a continuation-in-part of U.S. application Ser. No. 833,133, filed Sept. 14, 1977, by the same inventor and now abandoned.

BACKGROUND AND SUMMARY OF THE INVENTION

Steam cooking of shellfish is an art long practiced. However, the cooked shellfish has a relatively short shelf life even when maintained at temperatures unfavorable to the growth of bacteria and retardant of decay. Such cooked shellfish typically have a shelf life of less than a week, freezing of the cooked product after cooking or after a week of refrigerated storage resulting in a product of markedly reduced quality. Further, shellfish such as crabs, shrimp, and lobster which are steam-cooked prior to removal of the skeletal portions either by hand or by mechanical means invariably are difficult to separate from the skeletal portions due to the tendency of the edible portion thereof to adhere to the skeletal portions. In particular, mechanical removal techniques employing vacuum-induced meat removal forces are often relatively ineffective when processing shellfish cooked by prior art methods due to the adherence of the edible portions of the cooked shellfish to the skeletal portions and the non-contactive nature of such vacuum removal techniques.

Harris, in U.S. Pat. No. 2,155,308, provides a good example of prior art shellfish cooking methodology wherein steam under pressure is used to cook shrimp, crabs and the like. Virtually every shellfish processing plant in the world utilizes at least a variation on the theme described by Harris; although it is to be noted that the general process of cooking shellfish with pressurized steam was not new with Harris. Harris does not teach subjection of steamed shellfish to a vacuum for any purpose. Lapeyre, in U.S. Pat. No. 2,978,334, generally describes a process for extracting edible portions of crustaceans from skeletal portions thereof. Lapeyre subjects cooked shellfish to a vacuum after freezing the shellfish, the vacuum being intended to explode the frozen shellfish in order that the edible portions can be manually removed from skeletal portions with a certain degree of increased facility. Lapeyre does not indicate the degree of vacuum required to cause such an explosion nor does he indicate that moisture is withdrawn from the shellfish during the "explosion" step. Lapeyre further indicates that the frozen cooked shellfish can be "exploded" by subjection of the shellfish to high pressure, "explosion" occurring on release either of the high pressure or of the vacuum.

The present invention provides an improved steam cooking method for shellfish wherein the cooked product exhibits a shelf life of greater than three weeks when maintained under refrigeration and which can be frozen after such period with substantial retention of desirable qualities. The present method acts to remove moisture from the entrails and body portions of the shellfish, thereby to "dry" the shellfish relative to other cooking processes and thus render the cooked product less subject to bacterial growth during the shelf life thereof. The present method further causes the edible portions of the shellfish to shrink to a degree which reduces adherence thereof to the skeletal portions thereby enabling more rapid and facile removal of said edible portions, especially when vacuum removal techniques are employed.

The invention further provides a method for preparing for cooking and cooking crabs known in commerce as red crabs, these crabs being found primarily in deep water along the Atlantic shelf at least from Maryland northward to Nova Scotia. Essentially, the red crab is pierced, such as through the mouth area, and the stomach and as much of the entrails as possible are removed such as by suction, the eviscerated crabs are then preferably placed in a cooking retort in a position such that drainage from the pierced area can occur during cooking. The crabs are then cooked according to the basic teachings of the invention.

Accordingly, it is an object of the invention to provide a method for steam cooking shellfish to increase the shelf life of the cooked product and to facilitate removal of the cooked edible portions of the shellfish from the skeletal portions thereof.

Further objects and advantages of the invention will become more readily apparent in light of the following detailed description of the preferred embodiments of the invention.

BRIEF DESCRIPTION OF THE DRAWING

The drawing is a schematic view illustrating an apparatus for performing the present method.

DESCRIPTION OF THE PREFERRED EMBODIMENTS

Figure 1:
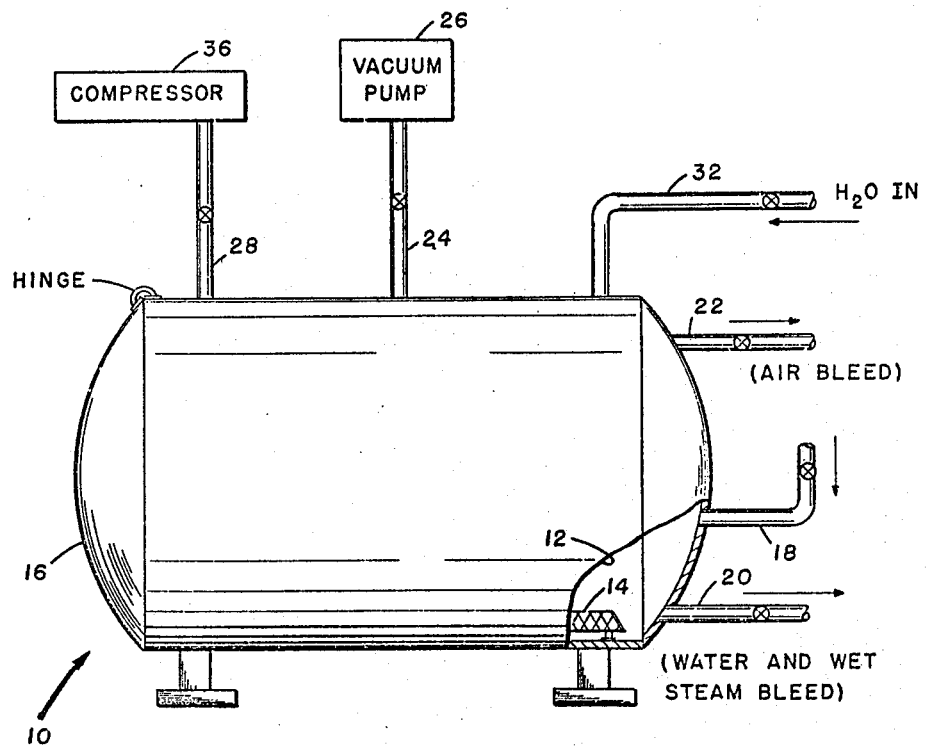

Referring to the drawing, a steam retort apparatus 10 is seen to comprise inner chamber 12 having racks 14 disposed in the lower portions of said chamber. Shellfish which are to be cooked are placed on the racks 14, entry to the steam retort apparatus 10 being gained through a hinged door 16. The shellfish are first subjected to steam which is admitted to the chamber 12 through a valved steam line 18 from a suitable source (not shown). The steam is preferably dry steam, water being preferably removed from the steam prior to admission of the steam into the chamber 12. The temperature of the steam can vary in a range between 115 and 240 degrees F., the pressure within the chamber 12 being held in a range between one to fifteen psig. Water and wet steam forming in the chamber 12, especially when the steam is held near the lower portion of the given temperature range, is bled from the chamber through a bleed valve 20. Air in the chamber 12 can be bled by means of a bleed valve 22 both before and after entry of steam into the chamber.

After the shellfish has been cooked for from one to thirty minutes, the supply of steam to the chamber 12 is interrupted and a vacuum is drawn within the chamber 12 through a valved vacuum line 24 which is connected to a vacuum pump 26. A vacuum ranging between one to twenty-six inches of mercury is drawn within the chamber 12, the vacuum conditions acting to prevent overcooking of the shellfish by rapid cooling of the shellfish. The shellfish are typically subjected to the vacuum at least initially at approximately that temperature to which the shellfish have been subjected in the steaming step described above. Moisture is further removed from the shellfish by the action of the vacuum. The essentially dry steam cooking and the vacuum condition cause substantial moisture to be removed from the "meat" portions of the shellfish and from the gut thereof. Removal of moisture from the gut reduces the ability of bacteria to grow within the shellfish and to thereby cause deterioration of quality. Removal of moisture from the "meat" portion reduces adherence to the exoskeleton, thereby rendering the meat portions more readily removable from the skeletal portions, particularly when mechanical extraction techniques are employed. The shellfish are preferably subjected to this 1-26 inches of mercury vacuum for a period of from 1 to 30 minutes.

After cooling, air under pressure can be admitted into the chamber 12 through a valved line 28 by a compressor 36. The air can exist in the chamber 12 at a pressure between one to fifteen pounds psig from between one to thirty minutes. Although admission of pressurized air is not necessary to a successful practice of the basic method, the utilization thereof acts to drive additional moisture from the cooked shellfish.

The cooked shellfish can also be atomized with water through a valved spray line 32, the water acting to add weight to the "meat" portions of the cooked product without substantially raising the moisture content in the gut, which moisture content has been intentionally reduced by prior method steps. The use of water is not necessary to a successful practice of the basic method but can produce an increase in weight of the cooked shellfish without degradation of desirable effects previously produced. Since the "meat" portion of the shellfish has already been caused to "release" from the skeletal portion, raising the moisture content of the "meat" portion will not cause said portion to readhere to the skeletal portions. The water can be sprayed or atomized under a pressure of between ten to fifty pounds for one to thirty minutes.

It is to be understood that the shellfish of differing type will have varying cooking times. For example, shrimp cooked according to the invention could be considered sufficiently cooked after exposure to steam at approximately 175 to 250 degrees F. for as little as one minute. After the cooking retort reaches the desired cooking temperature on placement of shellfish therein, certain crab species can be cooked in as little as five minutes, usual cooking times being between 5 and 30 minutes for most crab species. The blue crab, *Callinectes sapidus*, should typically be cooked according to the invention from twelve to fifteen minutes at approximately 240 degrees F. Cooking times will vary in relation to temperature. The cooked blue crab would then be preferably subjected to vacuum according to the invention for from 10 to 25 minutes, the vacuum preferably being within the range indicated hereinabove. The rate of application of the vacuum is such that no disruption is caused to the structure of the skeletal portions. Blue crabs and other shellfish processed according to the invention are preferably stored at 40 to 50 degrees F., it being often desirable to atomize the stored cooked shellfish with moisture.

The crab known from the Atlantic Ocean as the red crab can be processed according to the invention with certain preliminary steps being taken prior to cooking. In particular, the body of the red crab is pierced such as through the mouth and the mouth, stomach, and other portions of the gut substantially removed, such as by suction. Internal pressure within the crab is thus relieved and internal organs and fluids which can cause spoilage are at least substantially removed. The eviscerated crabs are preferably stacked within the cooking retort such that drainage from the pierced portions of the crab can occur at least before and during cooking. Crabs of this species are preferably steamed between 8 and 10 minutes at 240 degrees F. The retort should be filled to a maximum of 75% of capacity in order to allow space for vapors from the crabs to escape. These vapors are preferably constantly bled from the retort. The crabs are subjected to pressures of between 12 to 15 pounds psig during cooking. The steamed crabs are then subjected to a vacuum in a range of between 10 to 25 inches of water. If the crabs are to be subjected to vacuum immediately after steaming, it should be understood that a certain time period dependent on equipment is necessary to draw a sufficient vacuum. During vacuum treatment, the temperature of the crabs typically drops to approximately 175 degrees F.

Crabs and crustaceans which inhabit deep water (400 to 600 feet or greater, for example) particularly should be eviscerated as aforesaid. These crab species hold water and thus create pressure conditions inside their bodies. Release of these pressure conditions has been found according to the invention to be necessary to a satisfactory cook and the obtainment of a quality meat. Crabs of these species which are not so treated require a greater cooking time and, even with a greater cooking time, spoil rapidly even under refrigeration when not eviscerated prior to cooking. While crabs such as the blue crab could be eviscerated in the same manner as is described for the red crab, it is not necessary to so process the blue crab. Deep water crabs which hold substantial pressure within their bodies such as most of the crabs of the Cancer genus are preferably eviscerated as aforesaid through the mouth parts or through a hole pierced in the shell.

Test results illustrating the unprecedented shelf life of crabs cooked according to the invention are as follows:

EXAMPLE I

Approximately one bushel of blue crabs were processed by each of the two cooking methods, one of the methods being the standard flowing steam retort method using 240 degrees F. steam for thirteen minutes followed by a two minute pressure drop to ambient, the other of the methods being according to the present invention. The particular method according to the invention utilized flowing steam in the same retort at 240 degrees F. for twelve minutes followed by ten minutes under vacuum conditions measured by a negative water pressure of ten inches. In each cook, the bushel of live crabs were disposed in a bushel basket closed loosely with a conventional lid. After processing, the cooked crabs from each cook were allowed to cool to ambient temperature (requiring approximately two hours) at which time the cooled cooked crabs were all placed in a commercial walk-in cooler at a temperature of 33 to 34 degrees F. The baskets in which the crabs were held during refrigeration were conventional bushel baskets covered as aforesaid and therefore subject to air flow and to natural contamination in the cooler in order to simulate commercial handling. At various times, crabs were removed from each group, placed in a polyethylene bag inside of a brown paper bag, transported to the laboratory in an ice chest where they were subjected to bacteriological analysis. Analyses consisted of determining the total plate count, fecal coliform, and presumptive *E. coli* present in the edible meat in accordance with standard methods for analysis of the crab meat. Primary intent of these tests was to compare rate of deterioration in the two groups of crabs following cooking. Results of the bacteriological tests are shown in Table I. Results indicate that the vacuum process of the invention produces cooked crabs with a lower total bacteria count than the standard cooking process. At 7 and 20 days of storage the total bacteria counts of crabs prepared by the vacuum process were substantially lower. Even after 20 days of storage in a commercial cooler, the crabs were close to accepted bacterial levels for canned crab meat. After 20 days of storage, crabs cooked by the vacuum process of the invention were palatable, had no offensive odor, and retained good flavor. The crabs cooked by the standard method had a strong odor after 20 days of storage and exhibited a fishy flavor. Bacterial levels of the crabs cooked according to the standard method were above those permitted for canned crab meat.

TABLE I (Basket Trade Preparation & Handling)

| | STANDARD COOKING | | |
|---|---|---|---|
| Day | Total Count | Coliforms MPN | E. coli MPN |
| 3 | 24,300 | 230 | <30 |
| 7 | 38,000 | 2,100 | <30 |
| 20 | 840,000 | 230 | <30 |

| VACUUM PROCESS | | |
|---|---|---|
| Total Count | Coliforms MPN | E. coli MPN |
| 17,200 | 210 | <30 |
| 21,000 | 930 | <30 |
| 140,000 | 30 | <30 |

The process of the invention clearly increases the storage life of the blue crab.

EXAMPLE II

Crabs cooked by the vacuum process of Example I above were frozen to a temperature of −11 degrees F. and stored at this temperature for three days. The crabs were removed and immediately placed in a Pyrex-Corning #3120, 250 mm ID dessicator. Vacuum was drawn on the dessicator with a Gast rotary pump having a 1.3 CFM capacity (25 inches of vacuum) and instantaneously released. The process so described was twice repeated. The crabs were examined and found to be unaffected, the shell structure of the crabs having not been altered.

EXAMPLE III

One bushel of red crabs were eviscerated through the mouth parts by vacuum and subjected to steam at 240 degrees F. for eight minutes, moist air, vapors, and water being bled from the retort within which the crabs were steamed. The steamed crabs were subjected to a vacuum of 12 inches of water for ten minutes. The crabs were refrigerated at 33 degrees F. for six weeks. At the end of the (3) week period the crabs were palatable and had virtually no odor.

Through practice of the present method in the several embodiments thereof, shellfish can be cooked with the shrinkage thereof controlled to advantage and with substantial increase in shelf life while retaining natural flavor and freshness. It is to be understood that the invention can be practiced other than as specifically described, the scope of the invention being defined by the appended claims.

What I claim is:

1. A method for cooking shellfish to increase shelf life and to facilitate removal of edible portions from the skeletal portions thereof, consisting of the steps of:
    subjecting the shellfish to steam to at least partially cook the shellfish; and
    withdrawing moisture from the shellfish, after subjection of the shellfish to steam as aforesaid, by subjecting the shellfish to a vacuum at a rate which causes no disruption to the structure of the skeletal portions.

2. The method of claim 1 wherein the step of subjecting the shellfish to steam comprises subjecting the shellfish to dry steam at a pressure in a range between one to fifteen psig and a temperature in a range between 175 to 240 degrees F. for a period of time ranging between one to thirty minutes.

3. The method of claim 1 wherein water and air are removed from contact with the shellfish before and during the step of subjecting the shellfish to steam.

4. The method of claim 2 wherein the step of withdrawing moisture from the shellfish comprises subjecting the shellfish to a vacuum of between one to twenty-six inches of mercury for a period of one to thirty minutes.

5. The method of claim 1 and further comprising the step of subjecting the shellfish to air under pressure subsequently to subjection of the shellfish to the vacuum.

6. The method of claim 1 and further comprising the step of spraying the shellfish with water for between one to thirty minutes subsequent to subjection of the shellfish to the vacuum.

7. The method of claim 1 and further comprising the step of eviscerating the shellfish prior to subjection thereof to steam.

8. The method of claim 7 wherein the shellfish comprises red crab.

9. The method of claim 8 wherein the eviscerating step includes piercing of the shell of the crab and subjecting interior portions thereof to suction by vacuum.

10. The method of claim 9 wherein the crab is pierced through the mouth parts.

11. A method for cooking shellfish to increase shelf life and facilitate removal of edible portions from the skeletal portions thereof consisting of the steps of:
    subjecting the shellfish to steam at a pre-determined temperature to at least partially cook the shellfish; and,
    subsequently subjecting the shellfish to a vacuum at least initially at approximately said predetermined temperature, said subjection to vacuum acting to cool said shellfish to a temperature below said predetermined temperature and to withdraw moisture from said shellfish, the shellfish being subjected to said vacuum at a rate which causes no disruption to the structure of the skeletal portions.

* * * * *